United States Patent [19]
Calton

[11] Patent Number: 5,655,380
[45] Date of Patent: Aug. 12, 1997

[54] STEP FUNCTION INVERTER SYSTEM

[75] Inventor: Dean Scott Calton, Lavernia, Tex.

[73] Assignee: Engelhard/ICC, Philadelphia, Pa.

[21] Appl. No.: 469,254

[22] Filed: Jun. 6, 1995

[51] Int. Cl.[6] ....................................................... F25B 1/00
[52] U.S. Cl. ..................... 62/228.3; 62/228.4; 236/78 D
[58] Field of Search .................... 62/228.1, 228.3, 62/228.4, 228.5, 201, 186; 318/801, 802, 807; 236/78 D

[56] References Cited

U.S. PATENT DOCUMENTS

| | | | |
|---|---|---|---|
| 4,566,289 | 1/1986 | Iizuka et al. | 62/228.4 |
| 4,718,247 | 1/1988 | Kobayashi et al. | 62/228.4 |

FOREIGN PATENT DOCUMENTS

| | | | |
|---|---|---|---|
| 1-217160 | 8/1989 | Japan | 62/505 |

OTHER PUBLICATIONS

"Three Phase 400V 1.5~7.5 kW", *Compact Inverter Instruction Manual TOSVERT VF-SXN*, entire Toshiba Manual E65804932, Toshiba Corporation, Tokyo, Japan, Jul. 1994.

*Primary Examiner*—Harry B. Tanner
*Attorney, Agent, or Firm*—Panitch Schwarze Jacobs & Nadel, P.C.

[57] ABSTRACT

The present invention comprises a motor control system for controlling the speed of an electrical motor in an air temperature control system having a control signal determined in accordance with various loads of the air temperature control system. An electrical energy source provides electrical energy to the control system. A motor starter has a starter input coupled to the electrical energy source and a starter output coupled to the electrical motor for receiving the electrical energy from the electrical energy source and selectably applying the received electrical energy to the electrical motor. An inverter is directly coupled to the starter input and to the starter output to bypass the starter and provide a frequency signal to control the speed of the electrical motor according to the control signal. The motor operates in a high speed mode and in a reduced speed mode wherein the mode of operation of the motor is determined according to frequency signal. Sensors providing the control signal may be temperature sensors for sensing a temperature to be controlled or pressure sensors.

18 Claims, 2 Drawing Sheets

STEP FUNCTION INVERTER SYSTEM

FIELD OF THE INVENTION

The present invention relates generally to air temperature control systems and, in particular, to air temperature control systems having electrical motors which may be operated at varying speeds.

BACKGROUND OF THE INVENTION

In prior art air temperature control systems electrical motors are used to drive system elements such as fans, compressors and pumps. System elements such as these are sometimes operated in simple on and off modes. Additionally, sometimes these systems are variably driven according to the thermal load on the air temperature control system. For example, the fan speed may be lowered in some air temperature control systems to deliver less air when ambient conditions require less cooling. In a similar manner, electrical motors driving compressors and pumps may be operated at higher speeds when more cooling is called for in air conditioning systems.

Many air temperature control systems are designed to have a plurality of different temperature control zones in which different amounts of cooling or heating maybe required. For example, the air conditioners of air temperature control systems of office buildings may be required to provide more cooling for offices which face the sun during the afternoon hours than for offices located on the opposite side of the building. Thus, temperature sensors and static pressure sensors are disposed in the various zones of the building in communication with the control systems in order to provide individual control signals representative of the temperature and pressure in the various zones. The control signals provided by the sensors are used by the air temperature control systems to variably control the temperatures of the various zones. This variable control provided by these systems may be performed by varying the speed of the electrical motors which drive the fans, compressors and pumps of the control systems. Therefore, motor control systems are required within air temperature control systems in order to vary the speed of the various motors.

Referring to FIG. 1, there is shown a prior art air temperature control system 10 which illustrates a known method of controlling an electrical motor 14. In the prior art air temperature control system 10 a motor starter 12 receives electrical energy from an electrical energy source, such as an AC supply line. The motor starter 12 selectably provides the received energy at its output by operating either as a substantially open switch or a substantially closed switch. When the motor starter 12 operates as a substantially open switch energy is not provided at its output. When the motor starter 12 operates as a substantially closed switch energy is provided at its output.

The energy at the output of the motor starter 12 of the control system 10 is applied directly to the electrical motor 14. The motor starter 12 may include an electrical contact which is selectably opened and closed in order to control the application of energy to the electrical motor 14. Thus in the motor control method of the air temperature control system 10, the electrical motor 14 may only be either on or off under the control of the motor starter 12. Because the electrical motor 14 of the air temperature control system 10 cannot be operated at any intermediate speeds it is not possible for it to save energy by running the electrical motor 14 at a lower speed.

Referring to FIG. 2, there is shown the prior art air temperature control system 20 which illustrates another known method of controlling electrical motors such as the electrical motor 14. In the prior art air temperature control system 20, the motor starter 12 receives electrical energy from a source such as an AC line and selectably applies the received electrical energy at its output as previously described with respect to the control system 10. However, in the air temperature control system 20 the energy at the output of the motor starter 12 is applied to an inverter 16 rather than to the electrical motor 14. The inverter 16 of the air temperature control system applies varying amounts of the energy it receives from the motor starter 12 to the electrical motor 14. The amount of energy applied to the electrical motor 14 varies according to a variable control signal applied to the inverter 16 by way of the inverter control line 18.

In this manner the electrical motor 14 of the air temperature control system 20 may be operated at variable speeds. This variable speed operation permits energy to be saved when reduced motor speeds are required. However, the presence of the inverter 16 itself introduces some energy loss into the air temperature control system 20. Therefore, when the electrical motor 14 is operated at full speed the air temperature control system 20 is less efficient than the air temperature control system 10 because of the presence of the inverter 16. Thus, the presence of the inverter 16 causes energy inefficiency at high motor speed within the control system 20. It is therefore desirable to provide an air temperature control system permitting the energy efficiency obtained by variable speed operation of the electrical motor 16 as found in the air temperature control system 20, while permitting the efficiency of the air temperature control system 10 when operating at full speed.

The present invention comprises a motor control system for controlling the speed of an electrical motor in an air temperature control system having a control signal determined in accordance with the thermal load of the air temperature control system. An electrical energy source provides electrical energy to the control system. A motor starter has a starter input coupled to the electrical energy source and a starter output coupled to the electrical motor for receiving the electrical energy from the electrical energy source and selectably applying the received electrical energy to the electrical motor. An inverter is directly coupled to the starter input and to the starter output to bypass the motor starter for controlling the speed of the electrical motor in accordance with the control signal. The inverter provides a frequency signal in accordance with the control signal wherein the frequency signal may be a variable frequency signal or a pulse-width modulated signal. The inverter receives AC energy from the energy source and may provide DC energy from the received AC energy wherein the frequency signal may be provided from the DC energy. The electrical motor operates in a high-speed mode and in a reduced-speed mode wherein the mode of operation of the motor is determined in accordance with the control signal. Sensors provide the control signal applied to the inverter. The sensors may be temperature sensors for sensing the temperature to be controlled at various locations or pressure sensors for sensing the pressure at various locations of the system.

SUMMARY OF THE INVENTION

Briefly stated, the present invention comprises a motor control system for controlling the speed of an electrical motor in a temperature control system having a control signal determined in accordance with the thermal load of the air temperature control system. An electrical energy source provides electrical energy to the motor control system. A motor starter has a starter input coupled to the electrical energy source and a starter output coupled to the electrical motor. The starter receives the electrical energy from the electrical energy source and selectably applies the received electrical energy to the electrical motor. An inverter is directly coupled to the starter input and to the starter output to bypass the starter for controlling the speed of the electrical motor in accordance with the control signal.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE PREFERRED EMBODIMENT

Figure 1:
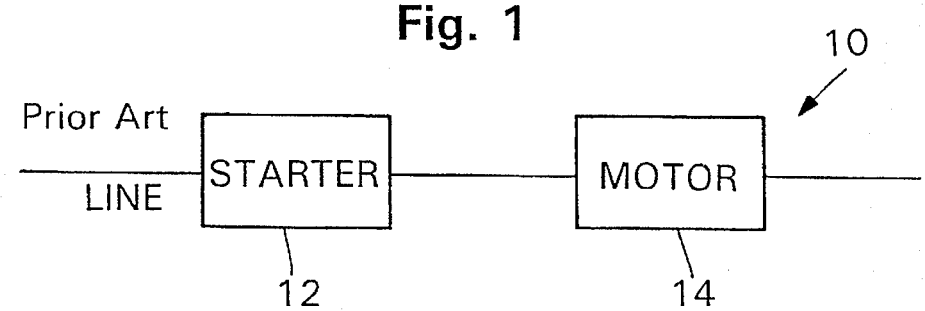
FIG. 1 is a block diagram representation of a prior art air temperature control system.
Figure 2:
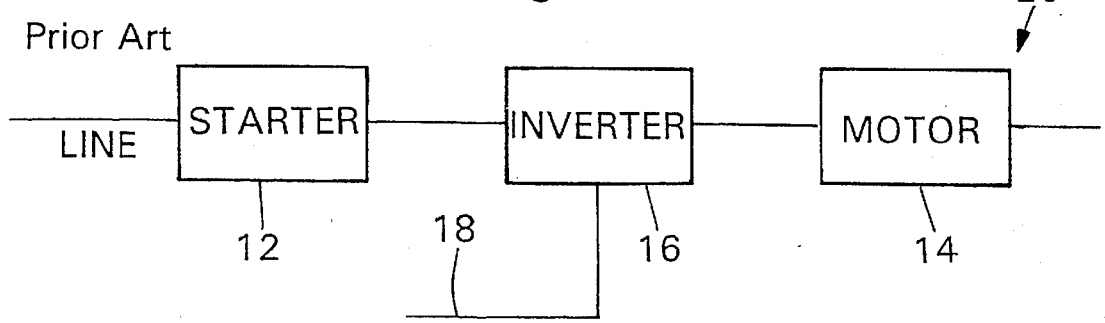
FIG. 2 is a block diagram representation of a further prior air temperature control system.
Figure 3:
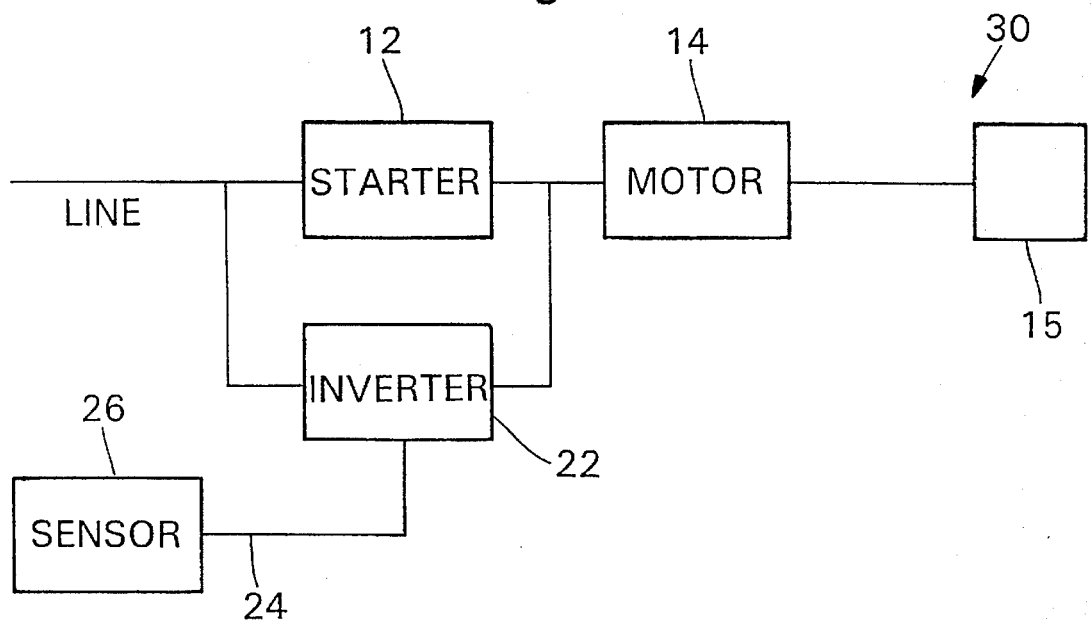
FIG. 3 is a block diagram representation of the air temperature control system in accordance with the present invention.

Referring to the drawings, wherein the same reference numerals are used to designate the same elements throughout, there is shown in FIG. 3 a block diagram representation of the air temperature control system 30 of the present invention. The air temperature control system 30 is provided with a motor starter 12 which may include conventional electrical contacts for switching electrical energy on and off. The input of the motor starter 12 is coupled to an electrical energy source such as a conventional three-phase line voltage for providing electrical energy. The motor starter 12 operates substantially like a switch which may be selectably opened and closed for selectably applying energy received from the electrical energy source to the output terminal of the motor starter 12. The output terminal of the motor starter 12 is coupled directly to an electrical motor 14. The electrical motor 14 is a fifty horsepower motor in the preferred embodiment of the air temperature control system 30. However, it is understood by those of ordinary skill in the art from this disclosure that motors of various horsepower could be used depending on the thermal load to be placed on the system 30. The motor 14 can be used to drive any element 15 of the air temperature control system 30, such as a fan, compressor or pump.

The air temperature control system 30 of the present invention is also provided with an inverter 22. The input of the inverter 22 of the control system 30 is directly coupled to the electrical energy source and the output of the inverter 22 is directly coupled to the electrical motor 14. Thus, the motor starter 12 and the inverter 22 of the air temperature control system 30 are directly coupled to each other in parallel.

When the motor starter 12 of the air temperature control system 30 receives electrical energy from the source of electrical energy and applies the received electrical energy directly to the electrical motor 14 it is effective to cause the electrical motor 14 to operate at full speed in the manner previously described with respect to the motor starter 14 of the prior art air temperature control system 10. This operation of the electrical motor 14 occurs when the motor starter 12 operates substantially as a closed switch effectively shunting or bypassing the inverter 22 and substantially directly applying the line source energy to the electrical motor 14. When the inverter 22 is effectively shunted out of the control system 30 the inefficiencies described with respect to the presence of the inverter 16 within the prior art control system 12 are substantially eliminated.

As previously described the motor starter 20 may also operate substantially as an open switch. In this configuration of the air temperature control system 30 the inverter 22 rather than the motor starter 12 controls the operation of the electrical motor 14. This configuration allows the electrical motor 14 to be operated at variable reduced speeds according to various system requirements.

A variable output frequency signal is provided at the output of the inverter 22 and applied to the electrical motor 14 for the purpose of variably controlling the speed of the electrical motor 14 in this manner. In order to provide the variable frequency signal the received line voltage is converted to DC within the inverter 22 in a conventional manner, for example, by using a rectifier device. The DC provided thereby is then converted to various frequency signals using, for example, oscillator circuitry.

The output frequency of the inverter 22 is controlled by a control signal applied to the inverter 22 by way of the inverter control line 24. In the preferred embodiment of the system 30 the control signal is a voltage level determined according to various thermal loads and local pressures within the air temperature control system 30 as sensed by conventional temperature or static pressure sensor 26 and applied to the inverter control line 24 by the sensor 26. Thus, the control system 30 senses the thermal loads being controlled and effectively applies different elements to the motor 14 wherein the different elements are understood to include elements such as the starter 12 and the inverter 22.

As the voltage level on the inverter control line 24 increases the frequency of the signal at the output of the inverter 22 increases. As the frequency of the output signal of the inverter 22 which is applied to the electrical motor 14 increases the operating speed of the electrical motor 14 increases. When lower frequency output signals are applied by the inverter 22 to the electrical motor 14 and the electrical motor 14 operates at lower speeds the electrical motor 14 requires less energy thereby permitting energy savings. The variable speed operation of the electrical motor 14 of the control system 30 occurs when the motor starter 12 coupled in parallel to the inverter 22 operates substantially as an open circuit. Additionally, it will be understood that a pulse width modulated signal, well understood by those skilled in the art, may also be applied to the electrical motor 14 in order to provide variable speed operation of the electrical motor 14 in the air temperature control system 30.

Figure 4:
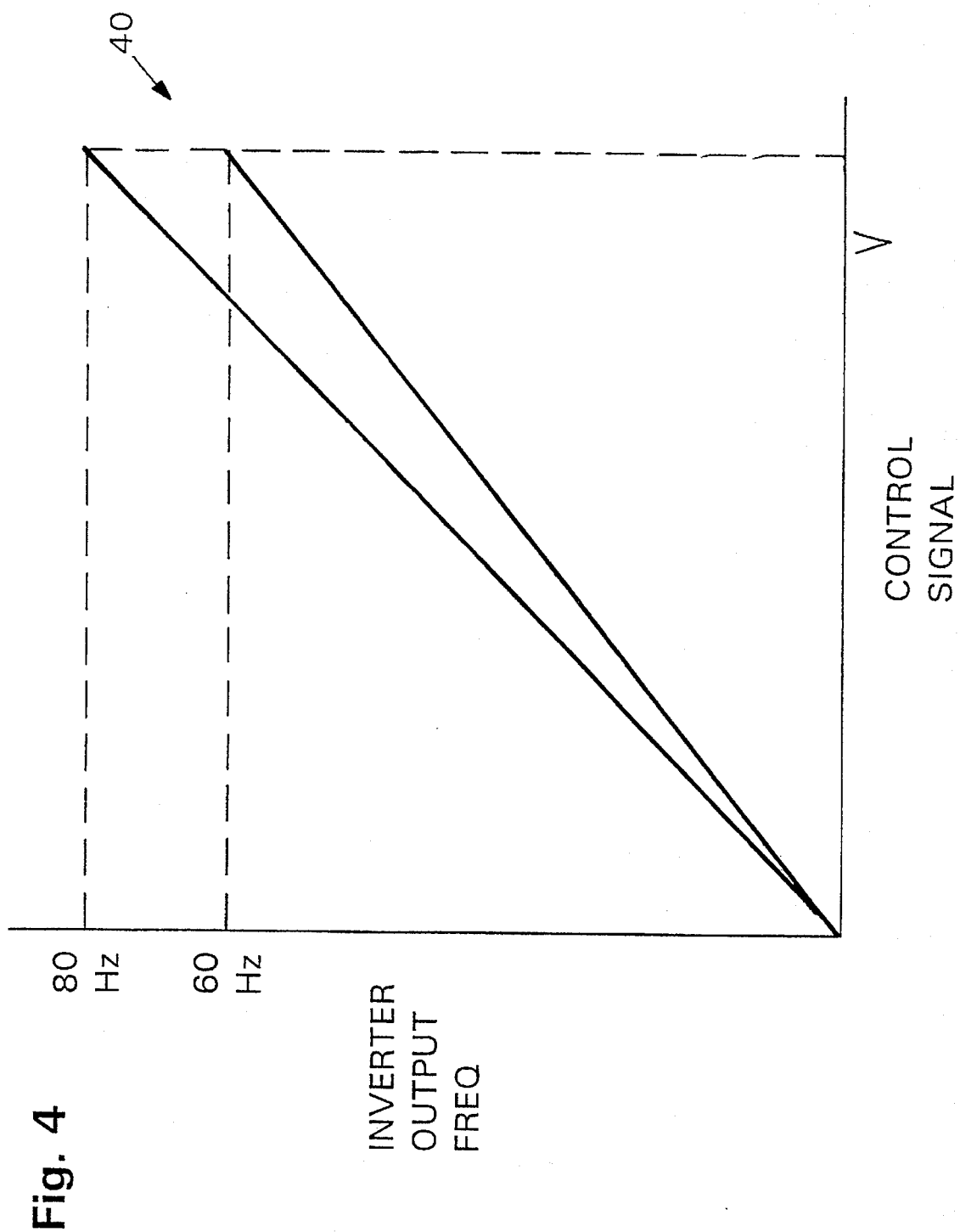
FIG. 4 is a graphical representation of the operation of the inverter of the air temperature control system of FIG. 3.

Referring to FIG. 4, there is shown a graphical representation 40 illustrating the output frequency signal of the preferred embodiment of the inverter 22 of the air temperature control system 30 as it varies in accordance with the voltage level of the control signal applied to the inverter control line 24. As the level of the voltage applied to the inverter 22 by way of the inverter control line 24 increases to the value V, the output frequency of the inverter 22 may increase either to sixty hertz or to eighty hertz depending on the programming of the inverter 22 in a manner well understood by those skilled in the art. An example of an inverter 22 suitable for the purpose of programmably providing a sixty hertz output or an eighty hertz output in this manner is the Toshiba Tosvert VF-SXN. Although only two frequency ranges are illustrated in the graphical representation 40 it will be understood by those skilled in the art that conventional inverters providing any other suitable frequency ranges are intended to fall within the spirit and scope of the present invention.

Thus, within the air temperature control system 30 the control voltage level applied to the inverter control line 24 may be used to vary the speed of the electrical motor 14 and thereby save energy. Significant energy savings may be achieved in this manner because the energy usage of the electrical motor 14 within the air temperature control system 30 falls off as the ratio of the motor speeds raised to the third power. For example, if the speed of the electrical motor 14 of the control system 30 in its high speed mode speed is represented as "1" and the speed in a reduced speed mode is 20% lower, such that the reduced speed is 0.8 of the high speed, the energy usage at the reduced speed may be calculated as follows:

$$[0.80/1.0]^3 = 0.512$$

Therefore, decreasing the operating speed of the electrical motor 14 by 20% using the variable speed control ability of the inverter 22 provides almost a 50% reduction in the energy usage of the electrical motor 14 within the air temperature control system 30 of the present invention.

Thus, the inverter 22 and the motor starter 12 may be alternately applied to the electrical motor 14 according to the control signal on line 24. It will be understood that this combining of the inverter 22 in parallel with the motor starter 12 permits a maximizing of the efficiency of air temperature control system 30. Combining the inverter 22 and the motor starter 12 in this manner permits substantially the efficiency of operation which may be achieved when the temperature control system 30 effectively operates without an inverter in its high speed mode while still providing the efficiencies of variable speed operation when the temperature control system 30 uses the inverter 22 to operate in its reduced speed modes.

An additional benefit of this parallel coupling of the inverter 22 and the motor starter 12 is that the inverter 22 of the control system 30 may be sized smaller than the inverter 16 of the control system 20 for the same size electrical motor 14 because the inverter 22 is not required to operate at full motor speed when it is effectively shunted out of the circuit. When the inverter 22 is sized at half of the motor horsepower it is able to operate over 80% of the motor speed range. For example, a twenty-five horsepower inverter 22 is required for a fifty horsepower electrical motor 14 in the air temperature control system 30. It will be understood that this is a significant advantage because a twenty-five horsepower inverter 22 is substantially less expensive than a fifty horsepower inverter 16. Because the fans and pumps driven by the electrical motor 14 are sized for worse case ambient conditions that occur less than 5% of the year, the inverter 22 operates most of the year and only switches to full bypass speed during the relatively rare peak operation periods.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A motor control system for controlling the speed of an electrical motor in a temperature control system having a control signal determined in accordance with the loads of said temperature control system, comprising:
   an electrical energy source for providing electrical energy to the motor control system;
   a motor starter having a starter input coupled to said electrical energy source and a starter output coupled to said electrical motor, said starter receiving said electrical energy from said electrical energy source and selectably applying said received electrical energy to said electrical motor; and
   an inverter directly coupled to said starter input and to said starter output to bypass the starter, said inverter generating an inverter output frequency signal supplied to said electrical motor for controlling the speed of said electrical motor in accordance with said control signal, wherein during a high-speed mode of operation of said electrical motor, said electrical motor receives electrical energy from said starter and during a low-speed mode of operation of said electrical motor, said electrical motor receives electrical energy from said inverter.

2. The motor control system according to claim 1, wherein said inverter is sized smaller than said electrical motor.

3. The motor control system according to claim 1, wherein said inverter output frequency signal is a variable frequency signal.

4. The motor control system according to claim 1, wherein said inverter output frequency signal is a pulse width modulated signal.

5. The motor control system according to claim 2, wherein said inverter is sized at about one-half of the horsepower of said electrical motor.

6. The motor control system according to claim 1, wherein said high speed mode comprises about 80% or greater than a full speed of said electrical motor.

7. The motor control system according to claim 1, further comprising a sensor for providing said control signal.

8. The motor control system according to claim 7, wherein said sensor is a temperature sensor for sensing the temperature to be controlled by said motor control system and providing said control signal in accordance with said sensed temperature.

9. The motor control system according to claim 7, wherein said sensor is a pressure sensor for sensing the pressure of said motor control system and providing said control signal in accordance with said sensed pressure.

10. The motor control system according to claim 1, wherein said electrical motor is connected to and drives a load, said load comprising a fan.

11. The motor control system according to claim 1, wherein said electrical motor is connected to and drives a load, said load comprising a compressor.

12. The motor control system according to claim 1, wherein said electrical motor is connected to and drives a load, said load comprising a pump.

13. A method for controlling the speed of an electrical motor in a temperature control system having a control signal determined in accordance with a load of said temperature control system, comprising the steps of:
   applying electrical energy from an electrical energy source to said motor control system;
   coupling a motor starter input of a motor starter to said electrical energy source to receive said electrical energy from said electrical energy source;
   coupling a motor starter output of said motor starter to said electrical motor to apply said received electrical energy to said electrical motor during a high-speed mode of operation of said electrical motor; and coupling an inverter directly to said starter input and to said starter output and applying said control signal to said inverter to bypass said motor starter with said inverter and control the speed of said electrical motor in accordance with said control signal, said inverter generating an inverter output frequency signal supplied to said electrical motor during a low-speed mode of operation of said electrical motor.

14. The method according to claim 13, wherein said inverter output frequency signal is a variable frequency signal.

15. The method according to claim 13, wherein said inverter receives AC energy from said electrical energy source and provides DC energy from said received AC energy to provide said inverter output frequency signal from said DC energy.

16. The method according to claim 13, wherein said reduced speed mode comprises about 80% or less than the full speed of the motor.

17. In a temperature control system, a motor control system for controlling the current supplied to an electrical motor driving a load, the motor control system comprising:

a motor start circuit for supplying a first electrical current to the electrical motor;

an inverter connected in parallel with the motor start circuit for supplying a second electrical current to the electrical motor; and a control signal coupled to the inverter for switching the inverter into and out of the motor start circuit, wherein the motor receives the first current during high speed operation and the motor receives the second current during low speed operation, wherein low speed operation comprises about 80% or less load on the motor.

18. The motor control system of claim 17 wherein the inverter is sized at about one-half of the horsepower rating of the electrical motor.

\* \* \* \* \*